Oct. 14, 1952  K. R. DYE ET AL  2,613,732
SEAT SPRING

Filed March 26, 1948  4 Sheets-Sheet 1

INVENTORS.
Kenneth R. Dye &
BY Maurice Stubnitz

ATTORNEYS

Oct. 14, 1952 K. R. DYE ET AL 2,613,732
SEAT SPRING
Filed March 26, 1948 4 Sheets-Sheet 2
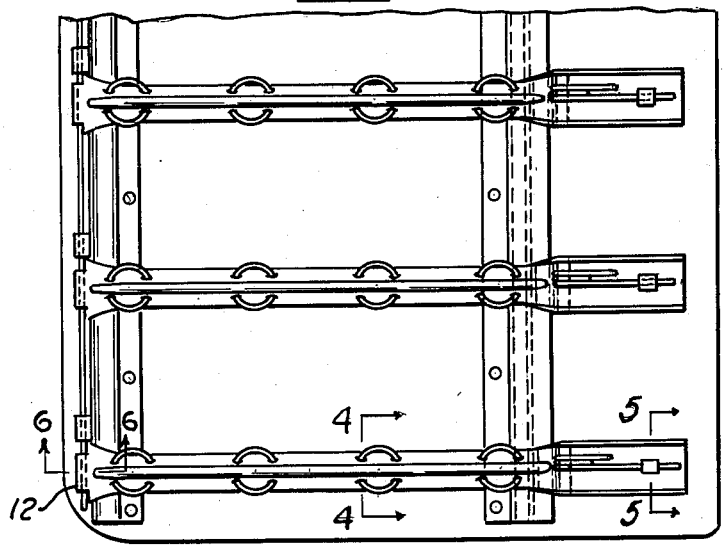
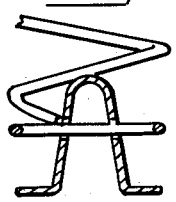
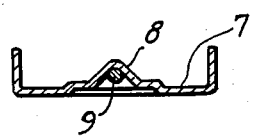
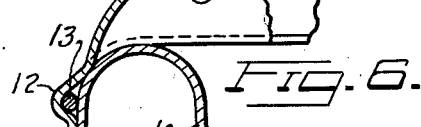
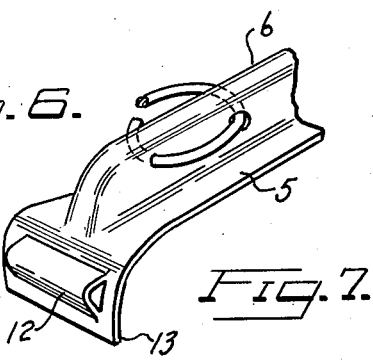
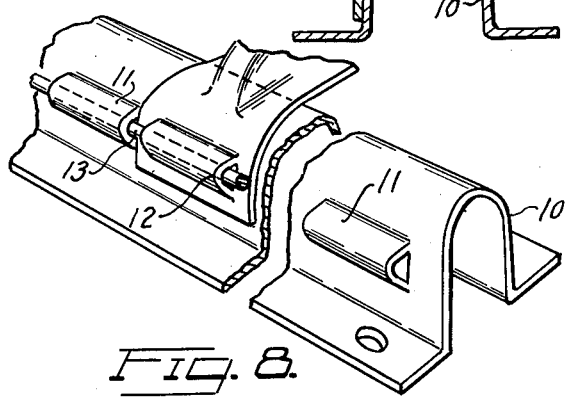
INVENTORS.
Kenneth R. Dye &
BY Maurice Stubnitz
ATTORNEYS

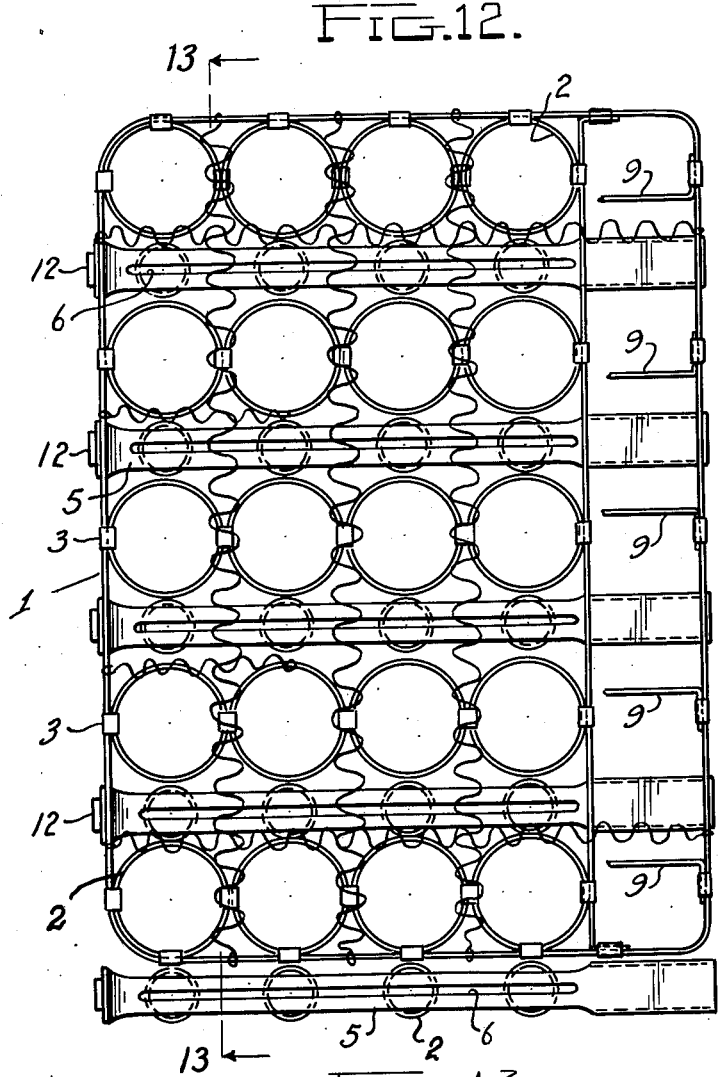
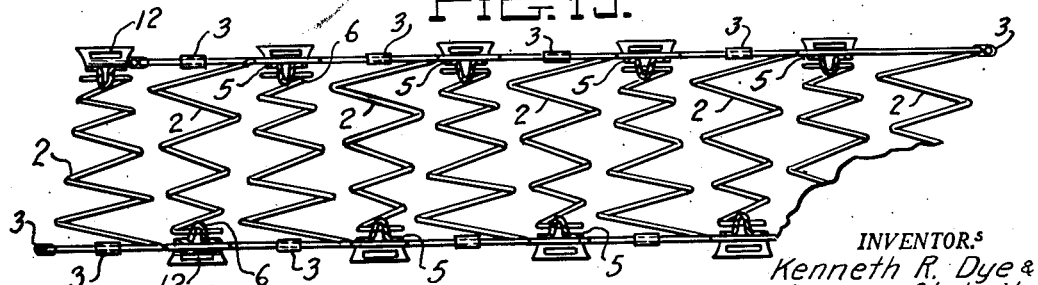

Patented Oct. 14, 1952

2,613,732

UNITED STATES PATENT OFFICE 2,613,732

SEAT SPRING

Kenneth R. Dye, Marine City, and Maurice Stubnitz, Adrian, Mich., assignors to Stubnitz-Greene Spring Corporation, Adrian, Mich., a corporation of Michigan Application March 26, 1948, Serial No. 17,134

3 Claims. (Cl. 155—179)

This invention relates to seat springs and it is the object of the invention to provide a seat spring which will result in a considerable saving in transportation costs. With material costs and labor costs at the present peaks the manufacturers are struggling to make every saving possible in the manufacture of automobiles.

Many designs employing zig-zag or wavy wire springs have been proposed or patented with a view of saving the costs of the seat springs and seat bottoms. But the wavy wire spring seat has disadvantages, discomforts and liability of the springs breaking.

It is the object of the present invention to secure some of the advantages of the wavy wire spring seat in cheapness of construction and saving in transportation costs and at the same time retain the advantages of the coil spring seat.

To this end we propose to employ a seat and particularly a seat bottom which is bereft of the usual lower seat bottom frame. It does, however, have the cross slats or connectors to which the bottoms of the coil springs are anchored. These cross slats or connectors are free and floating and unconnected one with the other when the springs are manufactured, consequently, two seat springs can be stacked or telescoped for shipping. Not only is the cost of the lower frame eliminated but the transportation costs are halved resulting in considerable saving—a saving that has not heretofore been achieved by the conventional type of seat springs employing the upright coil spring.

We want it understood, however, that while the invention is shown here with seat bottom springs that it can equally be worked out with some obvious changes for seat back springs. Our claims are drawn with the intention to cover both seat back springs and seat bottom springs.

Another feature of this seat bottom spring is that it affords a thinner or upwardly offset rear portion that affords toe clearance for the foot of one sitting in the rear seat.

Referring to the drawings:

Figure 3 is a horizontal section taken on the line 3—3 of Figure 1.

Figures 4, 5, and 6 are detailed sections taken on corresponding sectional lines of Figure 3.

Figure 7 is a fragmentary perspective of one of the cross slats or connectors.

Figure 8 is a fragmentary perspective of one of the anchor strips which is to be secured to the floor or the floor pan of the car.

Figure 9:
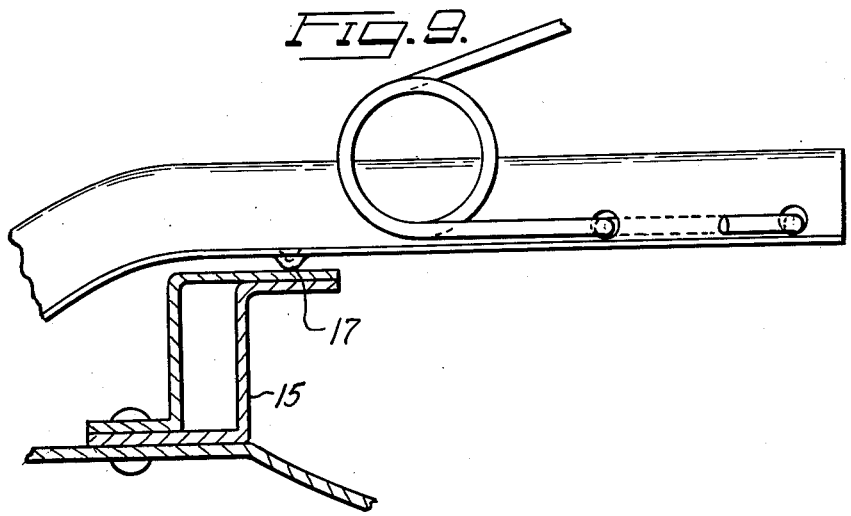

Figure 9 is a detail view showing how the cross slats are welded to the rear anchor strip secured to the floor pan.

Figure 10:
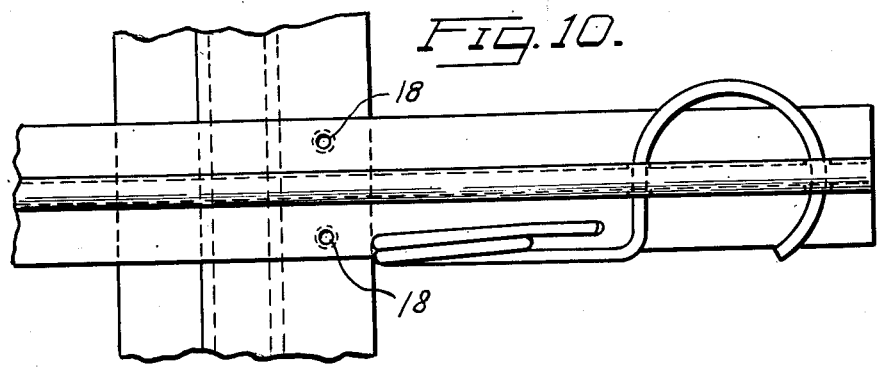

Figure 10 is a fragmentary plan view showing the cross strip after it has been secured to the rear anchor strip.

Figure 11:
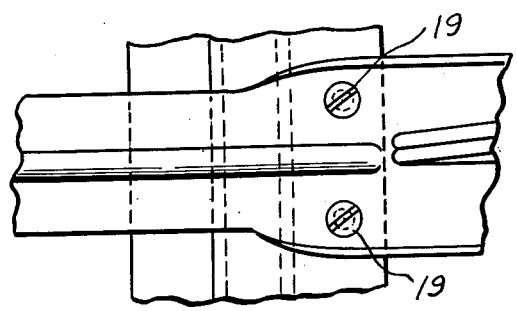

Figure 11 shows a modified form attachment of the cross slats to the rear anchor strip.

Figure 12 is a plan view showing how the spring seats can be nested for shipping.

Figure 13 is a section on the line 13—13 of Figure 12.

The manufacturer provides the usual wire upper frame member 1 or it may be a frame member constructed otherwise. The usual hourglass, cylindrical or conical upright springs 2 may be clipped to this frame by clips 3 and connected together by wavy wire springs 4 or any other suitable form of connectors.

In place of the usual lower frame member a plurality of free or floating cross slats 5 is provided. These may be in various forms but I prefer to use a cross slat such as shown in the drawings of inverted V-section. This affords the strength of corrugated metal. The sidewalls of the V may be perforated so that the lower whirl of the coil spring may be anchored to the slat by threading or screwing it into the holes of the slat in Figures 4 and 6. We prefer to have the cross slats with upwardly offset portions 7 at the rear. This offset portion has a channel cross section such as shown in Figure 5. It has a struck out section 8 which anchors the lower end 9 of a safety pin or a jack-knife spring. This spring gives the necessary flexible support at the back at a thin section of the spring seat where it would be undesirable to use a coil spring because of insufficient space to accommodate such a spring.

With the completely floating or independent cross slats and the independent rows of coil springs it is possible to stack or nest the spring seats together in a way that has not been heretofore possible. The under spring may be turned up and the upper spring may be telescoped or packed thereinto in what is ordinarily the space occupied by one seat spring. This is shown in Figures 12 and 13.

Figure 1:
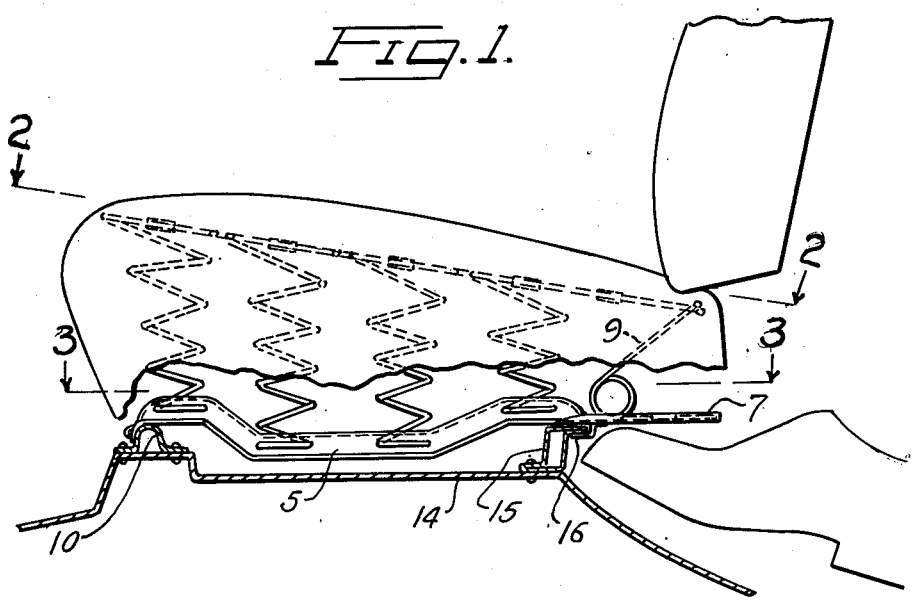
Figure 1 is an end elevation of a seat cushion partly broken away and showing our improved seat bottom spring installed in a car.
Figure 2:
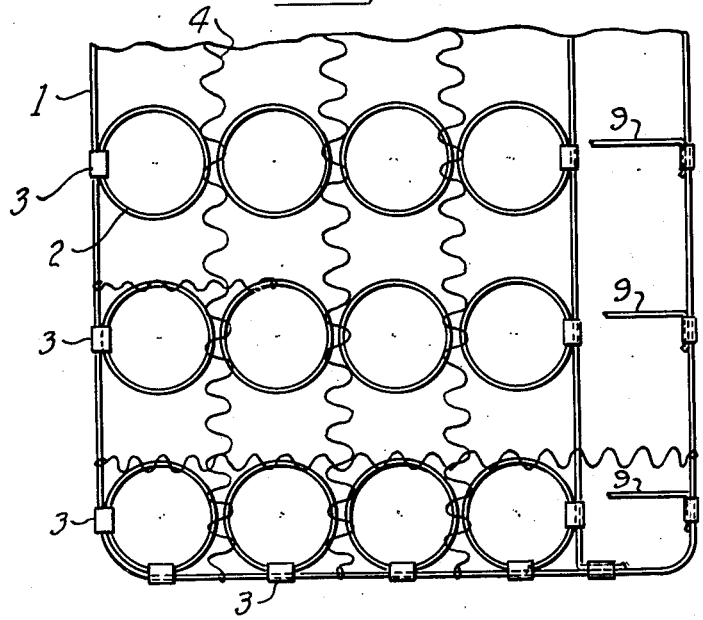
Figure 2 is a fragmentary plan view of the improved seat bottom spring taken on the line 2—2 of Figure 1.

When the spring is to be installed on a job a front corrugated anchor strip 10 is spot welded to the floor pan. This anchor strip has knuckles 11 punched out. These knuckles 11 are arranged to register with knuckles 12 which are struck out of the turned down ends 13 of the cross slats 5. Thereupon a wire or pin 13 may be threaded through the registering knuckles thereby anchoring the cross slats to the front anchor strip 10. Secured to the floor pan 14 near the rear of the seat are a pair of Z strips as shown in Figure 1. Or the cross slats may be a projection-welded to the top of the Z bars as shown in Figures 9 and 10. Nob 17 is struck out of the cross slat when these are formed. When the cross slats are to be installed in the job these are laid over the Z bars as shown in Figure 9 then suitable welding dies can be fitted over the slats and under the tops of the Z bars. The current is turned on and the dies pressed together resulting in the projection weld shown at 18, Figure 10. Or the bars may be secured by screws to the Z bars as shown in 19 in Figure 11. The front ends of the slats can also be secured by welding or drive screws.

What we claim is:

1. The combination of a floor, an anchor strip secured thereto having knuckles struck out at spaced points along the strip and a seat spring having spaced rows of springs extending from front to back, spaced cross slats supporting the springs of one row, the cross slats provided each with a turned down front end having a struck out knuckle adapted to register with a knuckle of the anchor strip, and a wire or pin threaded through each pair of registering knuckles.

2. A seat spring for stacking and telescoping for storage or transportation, having in combination an upper frame member, spaced rows of coiled supporting springs some of which are secured to the upper frame, connectors for tying the upper ends of said springs to each other and the upper frame, floating cross slats with free unattached ends connecting the lower ends of said springs in rows, the rows of springs and cross slats being spaced from one another at least the width of a cross slat and its row of springs, each row and its supporting cross slat being entirely independent of another and spaced a distance greater than the O. D. of the top coil of the coiled supporting springs, so that two spring seats can be telescoped or packed together by allowing rows of one spring seat to pass between the rows of the other seat spring in inverted position, the cross slats have upwardly offset portions and safety pin type springs having lower legs secured to this upwardly offset portion and upper legs secured to the upper frame member.

3. A seat spring for stacking and telescoping for storage or transportation, having in combination an upper frame member, spaced rows of coiled supporting springs some of which are secured to the upper frame, connectors for tying the upper ends of said springs to each other and the upper frame, floating cross slats with free unattached ends connecting the lower ends of said springs in rows, the rows of springs and cross slats being spaced from one another at least the width of a cross slat and its row of springs, each row and its supporting cross slat being entirely independent of another and spaced a distance greater than the O. D. of the top coil of the coiled supporting springs, so that two spring seats can be telescoped or packed together by allowing rows of one spring seat to pass between the rows of the other seat spring in inverted position, a floor pan provided with anchor strips fastened thereto, the cross slats at the front have turned down portions each with a struck out knuckle for registering with a knuckle struck out from a front anchor strip, the registering knuckles having each pair a wire to anchor the seat spring to the floor pan.

KENNETH R. DYE.
MAURICE STUBNITZ.

REFERENCES CITED

The following references are of record in the file of this patent:

UNITED STATES PATENTS

| Number | Name | Date |
|---|---|---|
| 847,023 | Ostrander | Mar. 12, 1907 |
| 1,164,534 | Lewis | Dec. 14, 1915 |
| 1,457,658 | Green | June 5, 1923 |
| 1,544,872 | Trimble | July 7, 1925 |
| 1,544,873 | Trimble | July 7, 1925 |
| 1,918,618 | Stubnitz | July 18, 1933 |
| 1,940,637 | Stubnitz | Dec. 19, 1933 |
| 1,940,853 | Flint | Dec. 26, 1933 |
| 1,958,481 | Lee | May 15, 1934 |
| 1,977,051 | Falls | Oct. 16, 1934 |
| 2,022,959 | Gordon | Dec. 3, 1935 |
| 2,237,585 | De Fries | Apr. 8, 1941 |